Sept. 27, 1938.  C. D. BARBULESCO  2,131,032
POSITION INDICATOR
Filed Dec. 21, 1931
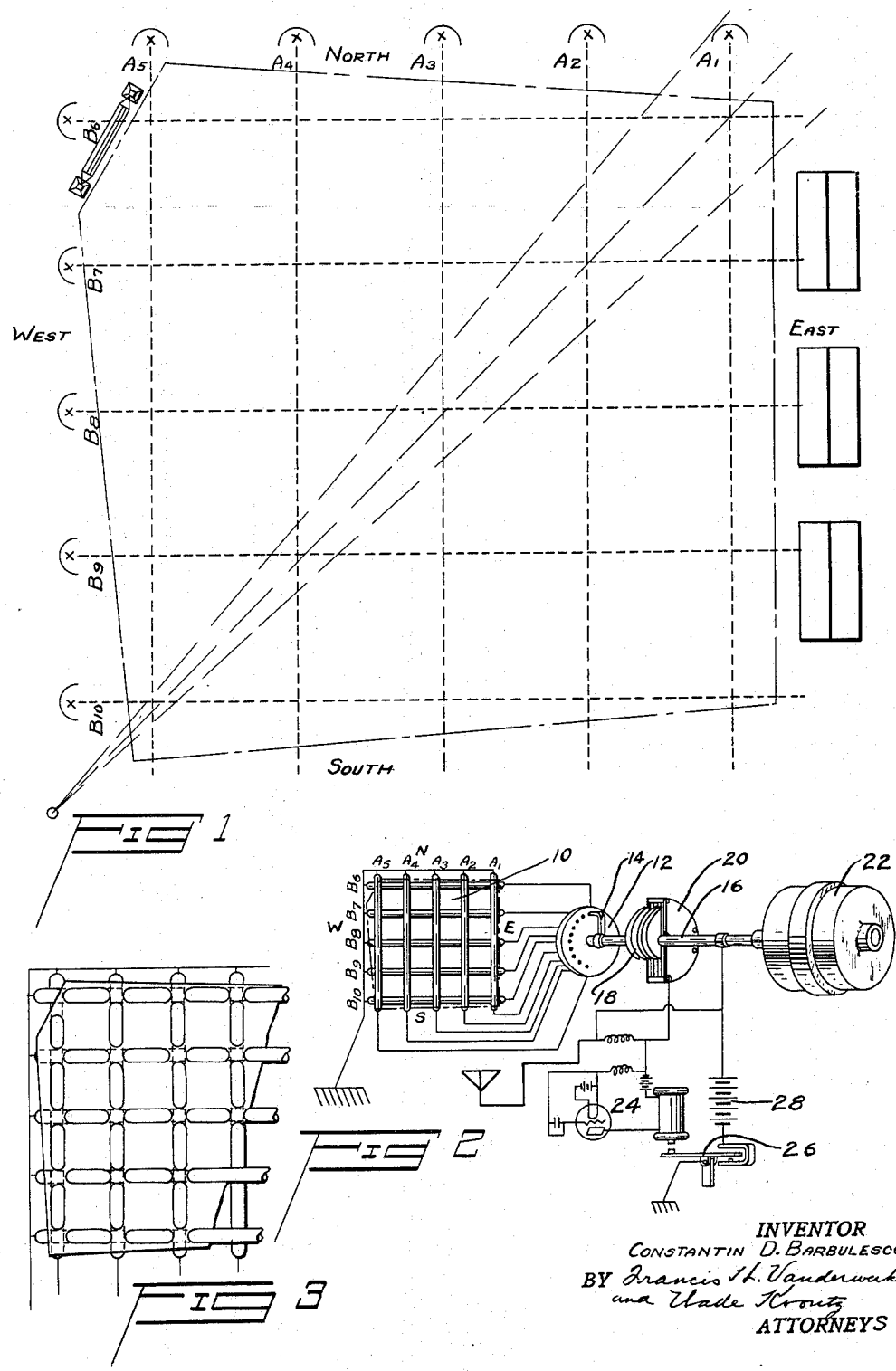
INVENTOR
CONSTANTIN D. BARBULESCO.
BY *Francis H. Vanderwaker
and Wade Krontz*
ATTORNEYS Patented Sept. 27, 1938

2,131,032

UNITED STATES PATENT OFFICE 2,131,032

POSITION INDICATOR

Constantin D. Barbulesco, Dayton, Ohio

Application December 21, 1931, Serial No. 582,363

5 Claims. (Cl. 250—11)

(Granted under the act of March 3, 1883, as amended April 30, 1928, 370 O. G. 757)

The invention described herein may be manufactured and used by or for the Government for governmental purposes, without the payment to me of any royalty thereon.

This invention relates to methods and systems for determining the location of a moving object and the direction of its travel.

The invention has particular application to such moving objects as airplanes or ships where it is difficult to determined the location due to lack of visibility.

A more particular object of the invention is to facilitate the landing of airplanes in fog by giving constantly to the pilot pertinent information as to his location with respect to the center of the field or surrounding obstacles.

The principle of the invention is to associate positions and directions on ground with beams of electromagnetic waves of different frequencies and to reproduce by flashes of light on a map, or by any other suitable signaling means the position of the aircraft over the landing field. The map is placed in front of the pilot who automatically is informed of his position with respect to the boundary of the landing field and therefore can attempt a landing without fear of running into the surrounding obstacles, as hangars, trees or radio towers.

In the drawing:

Fig. 1 is a schematic view of a landing field over which a network of radio beams are disposed in predetermined relation, together with the location of the hangars, radio towers, and conventional boundaries within which a safe landing can be made;

Fig. 2 is a diagrammatic representation of a map of the landing field and the radio receiving and controlling apparatus therefor; and Fig. 3 is an enlarged fractional view of the map and glow lamps shown in Fig. 2.

Five or more short wave projectors $A^1$, $A^2$, $A^3$, $A^4$, $A^5$, of the cylinder parabolic type or any other conventional type, are sending equally spaced and parallel beams of electromagnetic energy in the direction N—S; five or more similar projectors $B^6$, $B^7$, $B^8$, $B^9$, $B^{10}$, are sending beams in the direction E—W as indicated by the network of dotted lines. The width of these beams should not exceed more than one-fourth mile and each beam should have definite frequency.

The directions and locations of the radio beams are replaced on a map 10, which indicates clearly the location of boundary lines and obstacles, by narrow slots under which individual flashlights $A^1$, $A^2$, $A^3$, $A^4$, $A^5$, $B^6$, $B^7$, $B^8$, $B^9$, $B^{10}$, are provided. These flash-lights have a common connection to the ground or metallic mass of the aircraft and each of the other terminals respectively are connected to ten switch points on a multiple switch 12.

A switching arm 14 is rotated by a shaft 16, to which is attached a rotor 18 of a tuning condenser 20 and actuated by a motor 22 rotating at constant speed. The condenser tunes the input circuit of a conventional receiver 24, or better a self modulated high frequency oscillating detector as described in my Patent 1,905,332, granted April 25, 1933.

A relay 26 in the output of the receiver is actuated when the airplane crosses the path of a beam and closes the common battery 28 upon the corresponding circuit, flashing the light under the slot representing upon the map the corresponding beam.

It is obvious that the condenser should cover the range of frequencies used in the ground beams; moreover each portion of the rotor tuning the receiver to a frequency corresponding to one of the ground beams should correspond with the position of the switching arm closing the circuit which will operate the flashlight under the corresponding slot on the map.

Many variations of my invention can be developed by those skilled in the art without departing from the principle or object of the present invention. For instance, parallel rows of V-shaped beams disposed vertically with respect to the field, each row being defined by a definite frequency can replace the described beams. It is also possible to have all the beams working on the same high frequency and associate the positions and directions on the ground with another frequency modulating the common high frequency.

I claim:

1. Apparatus for use in the landing of aircraft on airdromes or the like, comprising means for producing a plurality of electromagnetic fields of varied frequencies, arranged in predetermined relation with respect to the airdrome, receiving means in the aircraft, indicating means connected with said receiving means comprising a plurality of gaseous discharge tubes arranged in parallel sets normal one to the other, means for automatically periodically tuning said receiving means to these respective fields and said indicating means being responsive to the received energy to indicate the relative position of the aircraft with respect to said airdrome.

2. In a radio apparatus to be used on a moving craft, the combination with a receiving circuit, means for periodically and continuously tuning said circuit to a plurality of varied frequencies, of a device including a plurality of indicators disposed in substantially normal relation one to another and corresponding in number to said frequencies, and a means operated in synchronism with the tuning of said circuit for selectively electrically connecting said indicators with the output of said circuit.

3. In a radio apparatus to be used on a moving craft, the combination with a receiving circuit, means for periodically and continuously tuning said circuit to a plurality of varied frequencies, of a signalling device, including a plurality of glow tubes corresponding in number to said frequencies, and a means operated in synchronism with the tuning of said circuit for selectively electrically connecting said indicators with the output of said circuit, said tubes being predeterminately arranged relatively to each other in such a manner that any two particular tubes corresponding to two different frequencies determine the position of the craft with respect to the sources of said frequencies.

4. In a radio apparatus to be used on a moving craft, the combination with a receiving circuit, means for periodically and continuously tuning said circuit to a plurality of varied frequencies, of a signalling device, including a plurality of elongated glow tubes corresponding in number to said frequencies, and a means operated in synchronism with the tuning of said circuit for selectively electrically connecting said indicators with the output of said circuit, said tubes being predeterminately arranged relatively to each other in the form of a grid so that the point of intersection of any two particular tubes corresponding to two different frequencies determines the position of the craft with respect to the sources of said frequencies.

5. In a system of aircraft navigation, a multiplicity of directively transmitted radiating paths of energy having progressively different signaling characteristics for marking a navigable course, means on an aircraft for receiving the energy radiated on said paths, a receiving apparatus carried by the aircraft and connected with said means, a circuit included therein for receiving signaling energy from a plurality of said radiating paths, circuits connected to said aforesaid circuit and responsive to the progressively different signaling characteristics of the transmitted energy and indicators connected in said circuits and extending in paths substantially normal one to another for indicating the position of the aircraft with respect to characteristics of the energy received from said paths.

CONSTANTIN D. BARBULESCO.